COLOR KINESCOPE

Filed June 5, 1948 2 Sheets-Sheet 1

INVENTOR.
LOUIS W. PARKER
BY R P Morris
ATTORNEY

COLOR KINESCOPE

Filed June 5, 1948 2 Sheets-Sheet 2

INVENTOR.
LOUIS W. PARKER

BY

R P Morris

ATTORNEY

Patented June 23, 1953 2,643,352

UNITED STATES PATENT OFFICE 2,643,352

COLOR KINESCOPE

Louis W. Parker, Little Neck, N. Y., assignor to International Standard Electric Corporation, New York, N. Y., a corporation of Delaware Application June 5, 1948, Serial No. 31,327

6 Claims. (Cl. 313—77)

This invention relates to image-reproducing systems, and more particularly it relates to the reproduction of television images in color.

A principal object of the invention is to provide an improved arrangement for converting received television signals into the desired colored reproductions.

Another object is to provide a television receiving tube of the cathode ray beam type having an image screen comprised of a series of adjacent elements of different color response, and simplified means for registering the cathode ray beam successively with the proper elements.

A further object is to provide a television receiving tube having a tri-color strip viewing screen and in addition to the usual main horizontal and vertical deflecting controls, there is provided separate means for subjecting the scanning spot to a signal-controlled subsidiary deflection.

A feature of the invention relates to a television receiving tube wherein the viewing screen is composed of a series of adjacent parallel linear strips arranged in sets, with the strips of each set designed to produce different light color responses when scanned by a focussed cathode ray beam; and a novel magnetic coil construction is provided for subjecting the spot during each linear sweep to a signal-controlled subsidiary deflection to register it with the proper colored strip of the screen.

Another feature relates to a cathode ray tube for color television, wherein the viewing screen comprises a fluorescent coating designed with adjacent linear elements each composed of at least three strips of different primary color response, and a grid electrode for controlling the dimensions of the focussed beam so that it strikes the screen in an elemental spot which has the same width as one of said strips; and a special magnetic field producing means is located adjacent the screen to control the subsidiary deflection of the beam.

The above-mentioned and other features and objects of this invention and the manner of attaining them will become more apparent, and the invention itself will be best understood, by reference to the following description of an embodiment of the invention taken in conjunction with the accompanying drawings, wherein.

Figure 1:
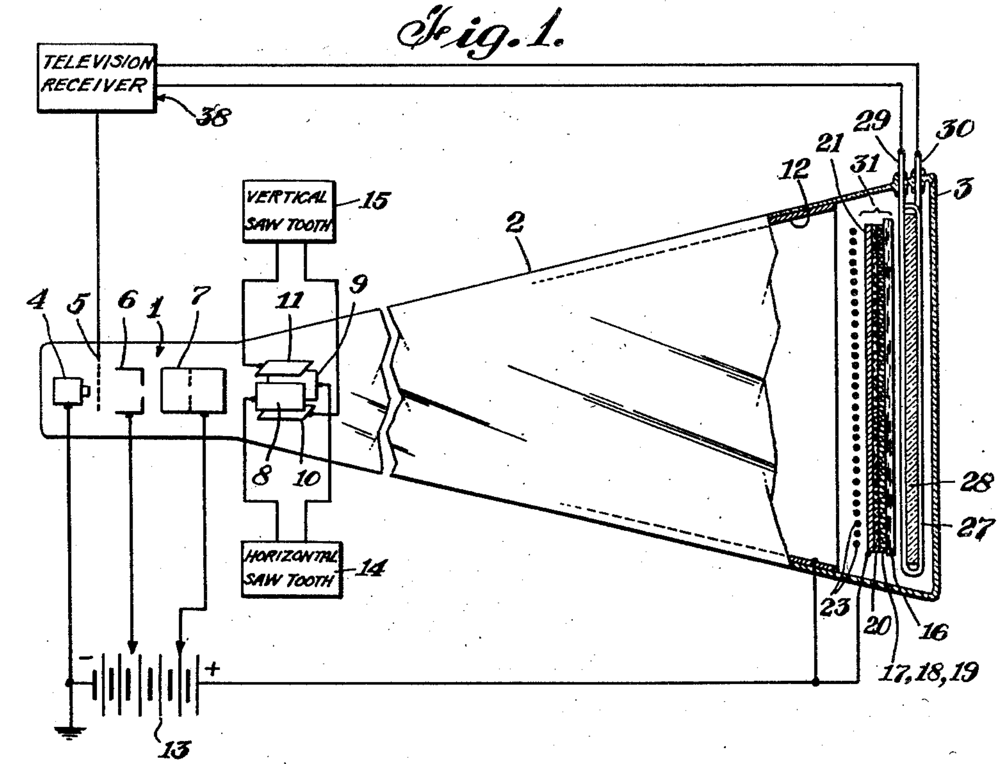
Fig. 1 is a top plan view, partly sectional, of a television tube embodying the invention.

The tube according to the invention comprises the usual enclosing evacuated envelope consisting of the neck portion 1, the flared body portion 2, and the screen or viewing portion 3. Suitably mounted within the neck 1 is any well-known form of electron gun and beam-focussing electrode array, comprising, for example, the usual electron-emitting cathode 4; the control grid or brilliancy control electrode 5; first accelerating anode 6; and second accelerating anode 7. In addition, there are the horizontal beam deflector plates 8, 9; the vertical deflector plates 10, 11; and the usual conductive coating 12 which may be applied to the interior surface of the flared body portion and connected to the high potential end of the D. C. power supply 13. It will be understood, of course, that the anodes 6 and 7 are likewise connected to suitable points on the supply 13. In the usual way, the horizontal deflector plates 8, 9, are excited with the saw-tooth deflecting voltage from any well-known source 14; and the vertical deflector plates 10, 11, are excited from the usual vertical deflection voltage source 15.

Figure 2:
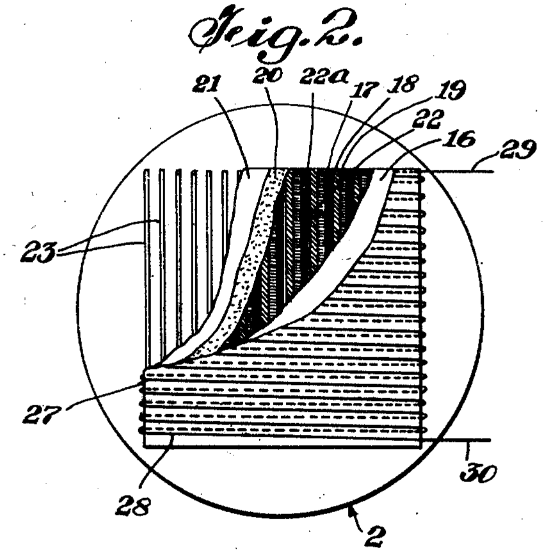
Fig. 2 is a right-hand end view of Fig. 1 with part of the viewing screen broken away to show its construction more clearly.

Suitably anchored or fastened interiorly of the tube adjacent the portion 3 is a light-transmitting sheet 16 of glass or mica. In one embodiment the sheet 16 has cemented to one side by a suitable transparent cement such as sodium silicate, a series of sets of adjacent parallel linear glass strips or slabs, each set consisting of three such slabs and with the slabs of each set of a different light color filter glass. Thus as schematically shown in Fig. 2, each set comprises a red filter strip 17, a green filter strip 18, and a blue filter strip 19. Merely for illustrative purposes, these strips are shown as extending in a vertical direction, for example perpendicular to the plane of the drawing as seen in Fig. 1.

The surface of the assembled light filter strips on the side facing the electron gun is coated with any suitable fluorescent material 20, such as is conventionally used in cathode ray tube screens. Preferably, although not necessarily, this fluorescent coating is of a kind which emits white light when scanned by the cathode ray beam. Preferably, the fluorescent coating 20 is itself coated on the side facing the electron gun with a layer of a conductive metal 21, for example aluminum of sufficient thinness to be transparent to the electrons in the cathode ray beam.

Ordinarily in black and white television tubes, the cathode ray beam would be focussed so that it strikes the viewing screen in a spot 22 which has a width equal to the width of each linear trace; and if the linear elements are straight, the scanning spot would execute a straight line trace along the length of each such element. In the tube according to this invention, the scanning spot 22a is focussed and controlled so that its width at the surface of the screen is one-third the width of each tri-color strip, that is to say, its width is equal to the width of each individual color filter strip 17, 18, 19, etc. If the received television signals represent the same color throughout the length of each vertical trace, then the spot 22a executes a straight line movement from one end of the strip to the other. For example, if the picture being transmitted is red over its entire surface, the scanning spot will trace the red strip of the first tri-color set linearly throughout its length, and then it will be deflected by the main horizontal deflector plates 8, 9, to register with the next red strip of the succeeding tri-color set. If, however, the color of a scanned linear element at the transmitter changes at any point between the ends thereof, it becomes necessary to give the spot 22a a subsidiary horizontal incremental deflection while it is executing its vertical scanning movement so as to bring the spot 22a into registry with the appropriate color filter strip of the tri-color set which is being scanned. In accordance with the invention, this subsidiary deflection is effected by setting-up a magnetic field closely adjacent the viewing screen and arranging its intensity and direction to cause the required subsidiary deflection of the scanning spot 22a.

Figures 3, 4, 5, 6, 7, 8, 9:
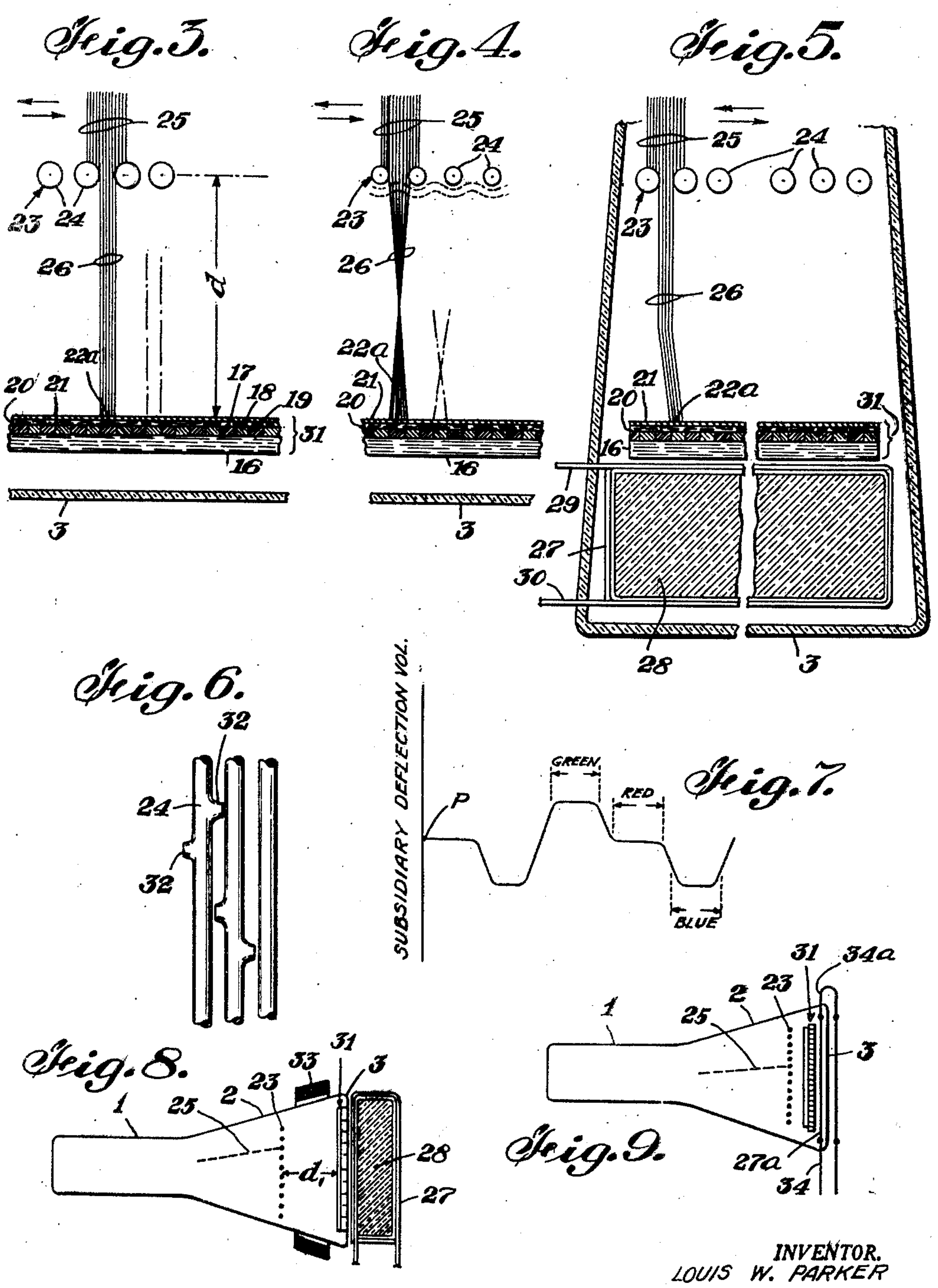
Fig. 3 is a greatly magnified view of part of Fig. 1.
Fig. 4 is a greatly magnified view similar to that of Fig. 3, but showing an alternative control of the dimensions of the scanning spot.
Fig. 5 is a magnified view similar to that of Fig. 3, showing the subsidiary deflection control magnet according to the invention.
Fig. 6 shows one preferred manner of forming the spaced grid wires according to the invention.
Fig. 7 shows the graph of current pulses for controlling the subsidiary beam deflection.

In order to control the width of the spot 22a with relation to the width of the individual color light filter strips, there is interposed in front of the screen, on the gun side thereof, a grid member 23 comprising a series of parallel spaced fine wires 24, the grid being mounted so that these wires extend parallel to the length of the color filter strips 17, 18, 19, etc. There is shown in Fig. 3, in greatly magnified form, a portion of the tube and wherein the focussed beam from the electron gun is represented by the numeral 25. The beam, as it arrives at the grid 23, has a width approximately equal to the distance between the centers of two adjacent grid wires. For example, the wires 24 may have a diameter or width of 0.01 inch and spaced apart 0.005 inch. As a result, the beam 25, as it strikes the screen, has its width reduced by two-thirds, so that it is equal in width to the color filter strips each of which is 0.005 inch wide.

In order to insure that the beam 25 after it passes the grid 23 remains of uniform width and free from spreading, the grid 23 should be located very close to the screen. For example, the distance *d* (Figs. 1 and 3) may be one-quarter inch, and since the electron gun is usually located at least eight or ten inches from the gun, the emergent beam 26 does not appreciably spread by the time it reaches the viewing screen.

If desired, the grid wires 24 can be of smaller width or diameter and spaced further apart, so as to permit a greater quantity of electrons to pass between adjacent grid wires, and in order to control the width of the spot 22a a relatively small potential can be applied to the grid wires 23 so as to render them slightly negative with respect to the coating 21, which coating is connected to substantially the same high positive D. C. potential as that of the coating 12. This forms curved equi-potential lines between adjacent grid wires, as shown in the dotted lines of Fig. 4, which tend to make the emergent beam 26 convergent and then divergent to the required extent, so that it strikes the screen in the spot 22a of the desired width. It will be understood, of course, that in the embodiment of Fig. 4 the distance between the centers of adjacent grid wires is the same as the distance between the centers of the grid wires of Fig. 3, and in each case, the number of grid wires employed will be one more than the number of tri-color filter strips on the screen. In other words, there will be the same number of linear grid spacings or openings as there are tri-color sets of elements on the screen. Consequently, as the beam 25 is deflected in the direction of the arrows (Fig. 3 or 4), under control of the main deflector plates 8, 9, it tends to scan the first color strip of each tri-color set, as represented by the dot-dash lined positions of the beam 26 as shown in Figs. 3 and 4. However, if the emergent beam 26 is given a subsidiary deflection, as will be described, it will scan the second or third color strip of each set, depending upon the signal that is received.

For example, when the subsidiary deflecting signal is at a median value, the beam 26 will scan a red strip; when it is below the median value it will be deflected so as to scan a blue strip; and when it is above its median value it will scan a green strip. Preferably, the subsidiary or color control deflection signal is in the form of square-topped waves as illustrated in Fig. 7. Since circuit arrangements are well-known for producing such square-topped waves, detailed description thereof is not necessary herein. In Fig. 7, the voltages for the respective colors are indicated, and the point P on the voltage ordinates may be either zero or it may be some steady value above zero voltage.

In order to control the subsidiary deflection of the beam, there is mounted within the cathode-ray tube a coil 27 for producing the required magnetic field having the desired deflection characteristics. Thus, as shown in Fig. 5, this coil 27 may consist of a fine wire of the order of 0.004 inch or less, wound helically around a glass plate 28 which may have a thickness of about 0.375 inch. The turns of the coil 27 may be wound at a pitch of 16 turns to the inch. As shown in Fig. 5, the magnetic axis of the coil extends perpendicular to the plane of the drawing so that the resultant magnetic field is perpendicular to the trajectory of the electron beam 26, and therefore results in a sidewise deflection of the end of the beam, also as indicated in Fig. 5. The glass block 28 with its coil 27 is suitably mounted within the cathode-ray tube closely adjacent the viewing end 3 of the tube and also closely adjacent the mica plate 16, so that the picture can be viewed through the turns of the winding 27, but the wire of this winding is of such small size that it does not interfere with the visibility of the reproduced image. The ends of the coil 27 are connected to suitable lead-in conductors 29, 30, which are supplied with the subsidiary deflection voltage above described, and present at the output of the television receiver 38.

The magnetic field of the coil 27 looking towards the electron gun decreases approximately as the first power of the distance from the coil when very short distances therefrom are considered. For distances approximating the thickness of the plate 28, for example 0.375 inch, the magnetic field intensity decreases as the second power of the distance. Beyond this point, the intensity of the magnetic field gradually decreases to the third power of the distance. Therefore, it is possible to set up a magnetic field which has the required intensity to effect the required subsidiary deflection of the beam 26 adjacent the reproducing screen, but the effect of this beam beyond the grid 23, looking towards the electron gun, can be neglected. In other words, the subsidiary deflection to control the color reproduction has negligible effect upon the main deflecting fields of the plates 8, 9, 10, 11.

Preferably at the transmitter the picture is scanned in successive full linear elements for one color and then it is re-scanned successively along each linear element for the remaining primary colors. Thus, during the red color analysis at the transmitter, there will be produced signals which cause the beam 26 to scan each full red linear strip of the fluorescent screen at the receiver. When the picture at the transmitter is being scanned for blue, the beam 26 will scan the blue strips of the reproducing screen, and likewise for the green scannings. With such an arrangement, the main horizontal scanning rate of the beam 26 may be 48,000. On this assumption then, the fundamental frequency of the waves (Fig. 7) which control the subsidiary deflection, will be approximately 16,000.

Preferably, the reproducing screen 31 which comprises the mica plate 16*a* with its attached color filter strips, fluorescent coating and electron permeable coating, is flat or planar in shape; and likewise the grid 23 is flat and its plane parallel to that of the reproducing screen. Since, however, the beam 26 does not impinge on the screen 31 always at an angle of 90°, this may be compensated for by making the color filter strips 17, 18, 19, etc. a little wider as they approach the edges of the screen.

Since the spacing of the grid wires 24 is of great importance, there is illustrated in Fig. 6 one preferred manner of fabricating these wires so as to preserve the proper inter-wire spacing. The grid wire of the desired diameter or thickness is first wound on a form of appropriate shape. During this winding operation, the wire 24 is nicked or swaged outwardly at about every inch of its length just before it is applied or wound on to the form. This nicking or swaging results in a flattening of the wire for a short distance, which provides an integral spacing tab or lug 32. These lugs abut against the next adjacent turn, thus making sure that all the turns are properly held in spaced relation. As an additional precaution, and in order to control the accurate size of the lug 32, the wire 24 may be run through a groove before laying down on the winding form in order to hold within the desired limits the protruding length of the said lugs 32.

While in the foregoing embodiments the grid 23 is located relatively closely to the screen 31, for example 0.25 inch, there is shown in Fig. 8 an arrangement wherein this grid 23 can be located at a much greater distance from the reproducing screen 31. For example, in the embodiment of Fig. 8, the grid 23 can be located as much as 2 inches from the screen 31. Surrounding the flared portion 2 of the tube in the region between the grid 23 and the screen 31, is any well-known focussing coil 33. This focussing coil is suitably energized so that the electron image which is formed between the wires of the grid 23 by the scanning movement of beam 25, is focussed at its terminating end to the appropriate size and shape on the said screen 31. Instead of mounting the subsidiary deflecting coil interiorly of the cathode-ray tube, it may be located exteriorly of the tube adjacent the viewing end 3 thereof. This coil may consist of a winding 27 on a transparent support or glass block 28. In Fig. 8, the tube is shown in top-plan view, wherein the linear color filter strips of the screen 31 are shown as extending perpendicular to the plane of the drawing. Therefore, the winding 27 is arranged so that its magnetic axis extends parallel to the length of its color filter strips, namely perpendicular to the plane of the drawing. Since the grid 23 is now located a considerable distance away from the screen 31, it is possible to locate the subsidiary deflecting coil 27 outside the tube. This has some advantage in reducing the cost of assembly and manufacture of the tube itself. It has the additional advantage that it is possible to subject the electrons of the beam emerging from the grid 23, to an additional accelerating and focussing action between that grid and the reproducing screen 31. Thus, by separating the subsidiary deflecting region effected by coil 27 from the electron accelerating region, a substantial saving in manufacturing cost of the deflecting equipment can be obtained.

Fig. 9 shows a further modification of Figs. 1 to 5, wherein the subsidiary deflecting coil has half of its winding inside the cathode-ray tube and half of this winding outside the cathode-ray tube. In this case the 16-turns-per-inch conductors 27*a* of the portion of the coil inside of the tube are connected in parallel, and provided with common lead-ins 34, 34*a*. This permits a greater separation between the conductors inside the tube and the conductors outside the tube and results in less volt amperes being required to effect the subsidiary deflection of the beam.

Figure 10:
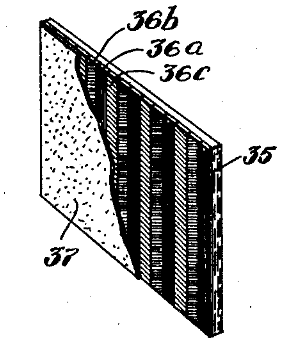
Figs. 8, 9 and 10 are respective modifications of the invention.

While in the foregoing, the reproducing screen has been described as consisting of a transparent backing plate which carries on one side a series of color light filter strips, it will be understood that a screen such as disclosed in my co-pending application Serial No. 31,325, filed on even date herewith, can be employed. Such a screen is illustrated in Fig. 10 and consists of a transparent backing plate 35 of mica or glass, the side of which facing the electron gun is coated with adjacent strips of fluorescent material 36*a*, 36*b*, 36*c*, each strip having a different fluorescent response, and corresponding to a respective one of the three primary colors, when bombarded by the cathode-ray beam. Thus, the strips 36*a* can be of a red fluorescing material; strips 36*b* of a blue fluorescing material; and strips 36*c* of a green fluorescing material. This tri-color fluorescent strip coating can then be provided with a coating 37 of aluminum of sufficient thinness as to be permeable to the electrons in the cathode-ray beam. For a detailed description of such a screen and preferred methods of making it, reference may be had to my co-pending application Serial No. 31,325, filed on even date herewith.

While I have described above the principles of my invention in connection with specific apparatus, it is to be clearly understood that this description is made only by way of example and not as a limitation to the scope of my invention.

What is claimed is:

1. Apparatus for producing color images, comprising an image reproducing screen having its area divided into sets of different color responsive strips, means to develop a scanning cathode-ray beam, means to deflect said beam in a predetermined scanning pattern over said screen independently of color variations, means between said deflecting means and said screen for focussing said beam on one strip at a time and other means adjacent said screen to cause said beam to execute subsidiary deflections along each scanning pattern trace and in accordance with received color control signals, said screen being located adjacent one end of a cathode-ray tube envelope, and said means to develop the cathode-ray beam including an electron gun located adjacent the other end of said envelope, and said other means including a magnetic field producing coil mounted within said envelope adjacent said screen on the side remote from said gun.

2. Apparatus for producing color images, comprising an image reproducing screen having its area divided into sets of different color responsive strips, means to develop a scanning cathode-ray beam, means to deflect said beam in a predetermined scanning pattern over said screen independently of color variations, means between said deflecting means and said screen for focussing said beam on one strip at a time and other means adjacent said screen to cause said beam to execute subsidiary deflections along each scanning pattern trace and in accordance with received color control signals, said other means comprising a plate of light transmitting material having a coil wound therearound to produce a magnetic field which is mutually perpendicular to the cathode-ray beam trajectory and the direction of said subsidiary beam deflection.

3. Apparatus for producing color images, comprising an image reproducing screen having its area divided into sets of different color responsive strips, means to develop a scanning cathode-ray beam, means to deflect said beam in a predetermined scanning pattern over said screen independently of color variations, means between said deflecting means and said screen for focussing said beam on one strip at a time and other means adjacent said screen to cause said beam to execute subsidiary deflections along each scanning pattern trace and in accordance with received color control signals, said screen being located adjacent one end of a cathode-ray tube envelope, and said means to develop the cathode-ray beam including an electron gun located adjacent the other end of said envelope, and said other means including a magnetic field producing coil mounted external to said envelope adjacent said screen on the side remote from said gun, and a plate of light transmitting material located outside said envelope on the side of screen remote from said gun, said coil being wound about said plate.

4. Apparatus for producing color images, comprising a cathode-ray tube having an electron gun for developing a focussed cathode-ray beam, a viewing screen inside said tube and comprising a mica plate having its side facing the gun provided with a series of sets of adjacent light filter glass strips, the strips of each set having respective primary color filter characteristics, a coating of fluorescent material on said strips facing the gun, a glass plate carrying a fine wire coil and mounted adjacent said mica plate on the side remote from said gun, a grid within said tube for confining the beam as it strikes said screen to a width equal to the color filter strip width, and means to energize said coil by color control signals to cause said beam to selectively register with the desired one of the color filter strips in a set.

5. Apparatus according to claim 4 in which said grid is mounted closely adjacent said screen, and said glass plate and coil are mounted within said tube between said screen and the viewing end wall of said tube.

6. Apparatus according to claim 4 in which said grid is mounted in substantial spaced relation to said screen, and said glass plate and coil are mounted external to said tube adjacent the viewing end wall thereof, and beam-focussing means are provided for focussing the beam emerging through said grid on said screen.

LOUIS W. PARKER.

References Cited in the file of this patent

UNITED STATES PATENTS

| Number | Name | Date |
|---|---|---|
| 2,307,188 | Bedford | Jan. 5, 1943 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,458,291 | Munster | Jan. 4, 1949 |
| 2,518,200 | Sziklai et al. | Aug. 8, 1950 |
| 2,532,511 | Okolicsanyi | Dec. 5, 1950 |

FOREIGN PATENTS

| Number | Country | Date |
|---|---|---|
| 443,896 | Great Britain | Mar. 10, 1936 |
| 103,823 | Australia | Apr. 26, 1938 |
| 866,065 | France | Mar. 31, 1941 |
| 868,403 | France | Sept. 29, 1941 |